Sept. 7, 1965  C. M. GOLD  3,205,422
ZENER-DIODE-CONTROLLED BATTERY CHARGER
Filed Feb. 20, 1961

INVENTOR:
CHARLES M. GOLD
BY Irving Holtzman
ATTORNEY

United States Patent Office 3,205,422
Patented Sept. 7, 1965

3,205,422
ZENER-DIODE-CONTROLLED BATTERY
CHARGER
Charles M. Gold, Franklin Square, N.Y., assignor to
Yardney International Corp., New York, N.Y., a corporation of New York
Filed Feb. 20, 1961, Ser. No. 90,360
1 Claim. (Cl. 320—39)

This invention relates to a device for charging electric storage batteries or accumulators. More particularly it provides a novel means for automatically disconnecting the battery from the charging source, when said battery is fully charged.

It is known that a storage battery is generally regarded as fully charged when its voltage, while on charge, reaches a point at which gases start generating at the electrodes. Accordingly, the means provided for disconnecting it automatically at the end of charge are usually controlled by battery voltage, although other means of control are sometimes used.

In cases where voltage control is utilized, the means for disconnecting the battery from the charging source usually comprise a line switch or contactor, operated from a voltage relay whose coil is connected across the battery terminals. The line contactor is in series in the charging circuit. When the battery voltage reaches a predetermined value, the voltage relay is energized causing the contactor to break the charging circuit and thereby disconnecting the battery from the charging source.

The system described above suffers from many drawbacks among which are its lack of accuracy with respect to voltage at which the break should occur. Furthermore, its bulkiness, excessive weight and high cost also are distinct disadvantages.

It is an object of this invention to provide a more accurate, a lighter, a more compact and a more economical control system for automatically disconnecting a battery from a charging source.

It is a further object of this invention to provide a more durable system of this type by eliminating, at least in part, the moving components present in a conventional circuit.

These and other objects of the invention will become apparent upon consideration of the accompanying specifications, claim and drawings of which:

Figure 1:
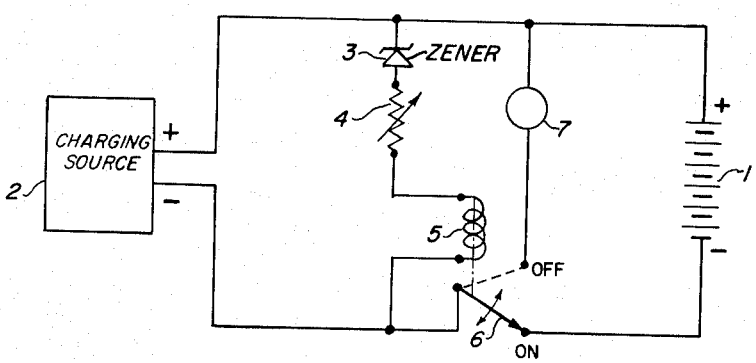
FIG. 1 is a schematic diagram of one embodiment of the invention.

Referring now to FIG. 1, there is shown a battery 1 which is connected to a charging source 2 by means of an electrical circuit arranged in accordance with the invention. As can be seen from the diagram, the battery 1 is shunted by a Zener diode 3 and is in series with a variable resistor 4 and a relay coil 5. The contact blade 6 of the relay is connected to the negative terminal of the charging source. When the contact blade 6 is in "ON"-position the negative terminal of the charging source is connected directly to the negative terminal of the battery 1 and the charging circuit is closed. When the contact blade 6 is in "OFF"-position the battery is disconnected and a pilot light 7 is connected instead to indicate the end of charge.

The characteristics of the Zener diode 3 employed in this invention are such so as to make it conducting when battery voltage reaches its "full-charge" point. The Zener diode 3 does not break down immediately upon connection across the charging source, since the current drain of the battery being charged results in a lowered potential across the Zener such that breakdown does not occur.

In the operation of the system, until the "full-charge" point is reached the Zener diode 3 is not conducting and the contact blade 6 remains in the "ON"-position. When the "full-charge" point is reached, the Zener diode 3 breaks down and starts conducting in the reverse direction. As a result, current starts flowing through relay coil 5 and the contact blade 6 is attracted to "OFF"-position, disconnecting the battery from the charging source. It will be readily understood that the function of variable resistor 4 is to limit the current in the diode branch of the circuit to a suitable value for the components.

Figure 2:
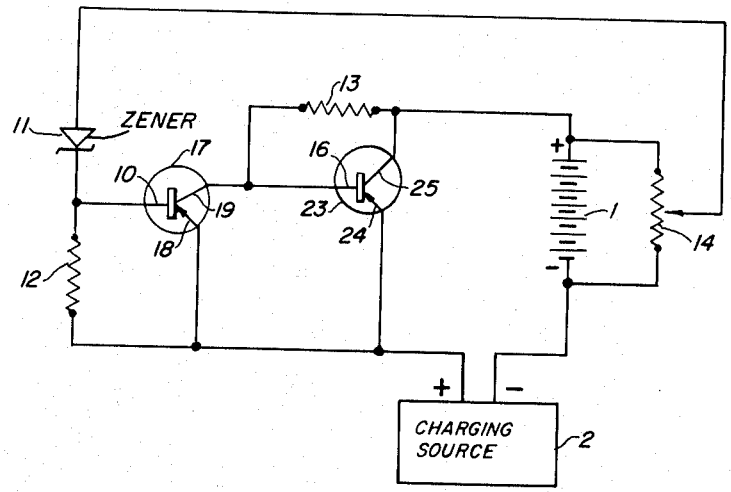
FIG. 2 is a schematic diagram of another embodiment of the invention.

FIG. 2 illustrates a transistorized version of the invention. One feature of this embodiment is that all moving parts are eliminated from the system. As seen in this figure, storage battery 1 is connected to charging source 2 through a series transistor 23.

The transistor 23 has its emitter 24 connected to the positive source terminal and its collector 25 connected to the positive battery terminal so that the emitter-to-collector resistance may be in series in the charging line. The base 16 of the transistor 23 is connected to the collector 19 of a second transistor 17. The collector 19 of the second transistor, in addition to being connected to the base 16 of the transistor 23 is also connected to one end of a resistor 13, the opposite end of which is connected to the positive battery terminal. The emitter 18 of the transistor 17 is connected directly to the positive source terminal. The base 10 of the transistor 17 is connected to a point intermediate a Zener diode 11 and a resistor 12. The Zener diode 11 and resistor 12 serially connect the positive source terminal to the adjustable tap of a potentiometer 14 which shunts battery 1.

From FIG. 2 can be seen that the Zener diode 11 is biased in reverse direction. Its characteristics are selected so that reverse breakdown will occur when the difference of potential between the positive source terminal and the tap potentiometer 14 reaches a given value.

The principle of operation is as follows:
When a storage battery is inserted in the circuit and a charging source connected to said circuit as shown in FIG. 2, a difference of potential will be established across the Zener diode 11. The magnitude of this potential difference will depend on the position of the adjustable tap of potentiometer 14. To insure proper operation, the adjustable tap will be set so as to develop a potential difference that would be somewhat below the reverse breakdown voltage of the diode 11, the exact setting being selected as will be explained further.

With the battery and the charging source connected as shown, a difference of potential will also appear between the positive source terminal and the positive battery terminal, thereby biasing the transistor 23 so as to render it conducting. As a result, current will start flowing through same, charging the battery.

By referring to FIG. 2, it further will become apparent that transistor 17, by contrast to transistor 23, will not become conductive as a result of the charging voltage being applied to the circuit, and will remain in a nonconductive state as long as the Zener diode 11 does not break down. Now, according to the invention, the circuit components and the setting of the adjustable tap of potentiometer 14 will be such that the breakdown of Zener diode is to occur only when the battery voltage reaches its "full-charge" value. When the "full-charge" is reached and the Zener diode is broken down, current will start flowing through the resistor 12, rendering the transistor 17 conductive. As a result, a voltage drop will develop across resistor 13, driving the base current of transistor 23 to cut off and thereby disconnect the battery from the charging source.

The new devices set forth above can be used without any great modification of existing equipment or increase of production cost. It will be understood, however, that numerous variations and modifications of the invention herein described can be made without departing from the spirit and scope thereof, hence the same is not to be limited to the specific embodiments disclosed except as defined in the appended claim.

What is claimed is:

A battery-charging system, comprising a source of direct current connectable across the terminals of an electro-chemical battery; circuit means for connecting said source with said battery and including a switch in series with said battery and said source, said switch having a first position wherein said source is connected with said battery and a second position wherein said source is disconnected therefrom; a relay coil for operating said switch, and a Zener-type breakdown device conductive upon attainment of a predetermined battery voltage connected in series with said coil and said switch for disconnection of said device from said battery upon breakdown thereof to energize said coil and displace said switch from said first position into said second position.

References Cited by the Examiner
UNITED STATES PATENTS

| | | | |
|---|---|---|---|
| 2,013,618 | 9/35 | Woodbridge | 320—40 |
| 2,499,663 | 3/50 | Medlar | 320—48 X |
| 2,769,131 | 10/56 | Immel | 317—33 X |
| 2,979,650 | 4/61 | Godshalk et al. | 320—35 |

LLOYD McCOLLUM, *Primary Examiner.*

MILTON O. HIRSHFIELD, ROBERT C. SIMS, RALPH D. BLAKESLEE, *Examiners.*